United States Patent
Xiong

(10) Patent No.: US 10,044,285 B1
(45) Date of Patent: Aug. 7, 2018

(54) ALTERNATING CURRENT CONVERSION CIRCUIT

(71) Applicant: Shenzhen Segre Electronic Co., Ltd, Shenzhen, Guangdong (CN)

(72) Inventor: Wanglong Xiong, Longyan (CN)

( * ) Notice: Subject to any disclaimer, the term of this patent is extended or adjusted under 35 U.S.C. 154(b) by 0 days.

(21) Appl. No.: 15/895,607

(22) Filed: Feb. 13, 2018

(30) Foreign Application Priority Data

Jan. 16, 2018 (CN) .......................... 2018 1 0041116

(51) Int. Cl.
*H02H 3/00* (2006.01)
*H02M 5/293* (2006.01)
*H02M 7/217* (2006.01)
*H02H 3/20* (2006.01)
*H02M 1/32* (2007.01)

(52) U.S. Cl.
CPC .............. *H02M 5/293* (2013.01); *H02H 3/20* (2013.01); *H02M 1/32* (2013.01); *H02M 7/217* (2013.01)

(58) Field of Classification Search
CPC ........ H02H 3/10; H02H 7/122; H02H 11/002; H01H 9/56; Y10T 307/826
USPC ...... 307/10.1, 19, 31, 64, 66, 113, 115, 125; 361/8, 18, 42, 35, 78, 87, 91.1, 170; 363/49, 56.01, 56.08, 70–73, 142
See application file for complete search history.

(56) References Cited

U.S. PATENT DOCUMENTS

| | | | | |
|---|---|---|---|---|
| 5,440,441 A | * | 8/1995 | Ahuja | H02H 3/06 361/62 |
| 5,534,768 A | * | 7/1996 | Chavannes | G05F 1/577 307/75 |
| 8,542,509 B2 | * | 9/2013 | Sagneri | H02M 3/158 363/69 |
| 8,614,866 B2 | * | 12/2013 | Billingsley | H01H 9/542 361/8 |
| 9,906,013 B2 | * | 2/2018 | Wassel | H02H 3/20 |

* cited by examiner

*Primary Examiner* — Rajnikant Patel
(74) *Attorney, Agent, or Firm* — Keegan Caldwell; Micah T. Drayton

(57) ABSTRACT

Disclosed is an alternating current conversion circuit including an AC input end, an AC output end, an intelligent conversion circuit, a voltage sampling circuit and a master control circuit. The intelligent conversion circuit is configured to output a standard voltage inputted by the AC input end to the AC output end, and convert a non-standard voltage inputted by the AC input end into a standard voltage and output the standard voltage converted to the AC output end, under the control of the master control circuit. The voltage sampling circuit is configured to sample the voltage inputted by the AC input end and the voltage outputted by the intelligent conversion circuit. The invention provides an intelligent AC conversion, allowing the electronic devices which are designed for a single power grid to be adapted to various power grids.

19 Claims, 3 Drawing Sheets

ALTERNATING CURRENT CONVERSION CIRCUIT

RELATED APPLICATION DATA

This application claims the benefit of priority of Chinese Patent Application Serial No. 2018 1 0041116.8, filed on Jan. 16, 2018, and titled "ALTERNATING CURRENT CONVERSION CIRCUIT," which is incorporated by reference herein in its entirety.

FIELD OF THE INVENTION

The present invention generally relates to the field of voltage conversion. In particular, the present invention is directed to an alternating current conversion circuit.

BACKGROUND

Due to the rapid development of science and technology, various electric devices emerge in the market and are traded and used globally. However, the state grid parameters in different countries may be varied; for example, some high-power pure inductive or resistive load devices, such as 110 VAC hair dryer, hair straightener, coffee maker, etc., designed for a state where a 110 VAC grid is applied, cannot be used in another state where a 220 VAC grid is applied. As a result, the resource is wasted and the user experience is degraded.

SUMMARY OF THE DISCLOSURE

In order to solve the technical problem above, the object of the present invention is to provide an alternating current conversion circuit capable of outputting different AC voltages adapted to different state grid parameters.

In an aspect, an embodiment of an alternating current conversion circuit is disclosed. The alternating current conversion circuit includes an AC input end, an AC output end, a master control circuit, an intelligent conversion circuit, and a voltage sampling circuit. The AC output end is connected to the AC input end. The intelligent conversion circuit has a first input end connected to the AC input end, a second input end connected to the output end of the master control circuit, and a first output end connected to the AC output end. The intelligent conversion circuit is configured to output a standard voltage inputted by the AC input end to the AC output end, and convert a non-standard voltage inputted by the AC input end to a standard voltage and output the standard voltage converted to the AC output end, under control of the master control circuit. The voltage sampling circuit has input ends connected to the AC input end and the output end of the intelligent conversion circuit, respectively, and an output end connected to a first input end of the master control circuit. The voltage sampling circuit is configured to sample the voltage inputted by the AC input end and the voltage outputted by the intelligent conversion circuit.

In a further embodiment, the alternating current conversion circuit may further include an overvoltage protection circuit, through which the AC input end and the AC output end may be interconnected, wherein a second output end of the master control circuit is connected to an input end of the overvoltage protection circuit In an additional embodiment, the alternating current conversion circuit may include an overvoltage protection circuit, through which the AC input end and the AC output end are interconnected, wherein a second output end of the master control circuit is connected to an input end of the overvoltage protection circuit.

In another embodiment, the overvoltage protection circuit may include a first resistor, a second resistor, a first diode, a first relay and a first negative-positive-negative (NPN) bipolar junction transistor, wherein the first relay is a single-pole double-throw relay, the second output end of the master control circuit is connected to a first end of the first resistor, a second end of the first resistor is connected to a first end of the second resistor and a base of the first NPN bipolar junction transistor, an emitter of the first NPN bipolar junction transistor is connected to a second end of the second resistor, the second end of the second resistor is grounded, a collector of the first NPN bipolar junction transistor is connected to an anode of the first diode and a first coil connecting end of the first relay, a second coil connecting end of the second relay is connected to a power supply and a cathode of the first diode, the AC input end is connected to a common connecting end of the first relay, a first output end of the first relay is connected to the AC output end, and a second output end of the first relay is idled.

An additional embodiment may include a temperature detection circuit and a fan control circuit, the temperature detection circuit being configured to detect a temperature of the working environment of the alternating current conversion circuit, wherein an output end of the temperature detection circuit is connected to a second input end of the master control circuit, and a third output end of the master control circuit is connected to an input end of the fan control circuit.

In a further embodiment, the temperature detection circuit may include a fourth capacitor, a twenty-second resistor and a thermistor, wherein a first end of the fourth capacitor and a first end of the thermistor are connected to the second input end of the master control circuit, a second end of the fourth capacitor is grounded, a second end of the thermistor is connected to the second end of the fourth capacitor, one end of first the thermistor is connected to the first end of the twenty-second resistor, and the second end of the twenty-second resistor is connected to a power supply.

In another embodiment, the intelligent conversion circuit may include a controlled silicon and a relay, through which the AC input end and the AC output end are connected, and the master control circuit is connected to the controlled silicon and the relay for controlling an on-off state of the controlled silicon and the relay.

In a further embodiment, the master control circuit may include a single chip and a peripheral circuit for the single chip.

An additional embodiment may include a rectification filter circuit, an AC-direct current (DC) conversion circuit, a rectification filter unit and a DC output circuit, wherein the AC input end is connected to an input end of the rectification filter circuit, an output end of the rectification filter circuit is connected to an input end of the AC-DC conversion circuit, an output end of the AC-DC conversion circuit is connected to an input end of the rectification filter unit, and an output end of the rectification filter unit is connected to an input end of the DC output circuit.

In another embodiment, the rectification filter circuit may be a bridge-type rectification filter circuit. In another embodiment, the AC-DC conversion circuit comprises an OB2281 chip and a peripheral circuit for the OB2281 chip.

In a further embodiment, the rectification filter unit may include a first rectification filter circuit and a second rectification filter circuit, and the DC output circuit may include a first DC output circuit and a second DC output circuit, wherein the output end of the AC-DC conversion circuit is connected to an input end of the first rectification filter circuit and an input end of the second rectification filter circuit, an output end of the first rectification filter circuit is connected to an input end of the first DC output circuit, and an output end of the second rectification filter circuit is connected to an input end of the second DC output circuit.

In an additional embodiment, the first rectification filter circuit may include a ninth diode and a fourteenth capacitor, the ninth diode is a dual diode, the output end of the AC-DC conversion circuit is connected to an anode of the ninth diode and a first end of the fourteenth capacitor, a cathode of the ninth diode is connected to a second end of the fourteenth capacitor, the first end of the fourteenth capacitor is grounded, and the first end and second end of the fourteenth capacitor are connected to the input end of the first DC output circuit.

In another embodiment, the second rectification filter circuit may include an eighth diode and a thirteenth capacitor, wherein the eighth diode is a dual diode, the output end of the AC-DC conversion circuit is connected to an anode of the eighth diode and a first end of the thirteenth capacitor, a cathode of the eighth diode is connected to a second end of the thirteenth capacitor, the first end of the thirteenth capacitor is grounded, and the first end and second end of the thirteenth capacitor are connected to the input end of the second DC output circuit.

In yet another embodiment, the second DC output circuit may include a second universal serial bus (USB) interface, a voltage reduction chip, and a peripheral circuit for the voltage reduction chip, and wherein the output end of the second rectification filter circuit is connected to an input end of the voltage reduction chip, and an output end of the voltage reduction chip is connected to the second USB interface.

Still another embodiment may include a voltage feedback circuit, wherein the output end of the first rectification filter circuit and the output end of the second rectification filter circuit are connected to an input end of the voltage feedback circuit, and an output end of the voltage feedback circuit is connected to a second input end of the AC-DC conversion circuit.

In another embodiment still, the voltage feedback circuit may include a fourth voltage stabilizer, a second isolation optocoupler, a first voltage regulator, a thirty-third resistor, a thirty-fourth resistor, a thirty-seventh resistor, a thirty-ninth resistor, a fortieth resistor and a forty-first resistor, wherein the output end of the first rectification filter circuit is connected to a first end of the thirty-third resistor and a first end of the thirty-seventh resistor, a second end of the thirty-third resistor is connected to a positive input end of the second isolation optocoupler and a first end of the thirty-fourth resistor, a second end of the thirty-fourth resistor is connected to a negative output end of the second isolation optocoupler and an output end of the fourth voltage stabilizer, an output end and the input end of the fourth voltage stabilizer are grounded, a second end of the thirty-seventh resistor is connected to a first end of the thirty-ninth resistor, a first end of the fortieth resistor and a common leading-out end of the fourth voltage stabilizer, an input end of the fourth voltage stabilizer is connected to a second end of the fortieth resistor, the second end of the fortieth resistor is connected to an anode of the first voltage regulator, a cathode of the first voltage regulator is connected to a second end of the thirty-ninth resistor and the first end of the forty-first resistor, and the second end of the forty-first resistor is connected to the output end of the second rectification filter circuit; and an output end of the second isolation optocoupler is connected to the second input end of the AC-DC conversion circuit.

In an additional embodiment, the first DC output circuit may include a first USB interface, an USB recognition chip connected to the first USB interface, and a peripheral circuit for the USB recognition chip, wherein an input end of the USB recognition chip is connected to the output end of the first rectification filter circuit.

In another embodiment, the USB recognition chip may be an SE2513 chip. In still another embodiment, the USB recognition chip may be an LT8022 chip.

The alternating current conversion circuit of the present invention comprises an intelligent conversion circuit, a voltage sampling circuit and a master control circuit. The intelligent conversion circuit is capable of directly outputting the standard voltage inputted by the AC input end, and alternatively, converting the non-standard voltage inputted by the AC input end into the standard voltage, under the control of the master control circuit. In the invention, the voltage sampling circuit is used to sample the voltage inputted by the AC input end and the voltage outputted by the intelligent conversion circuit. By means of the voltage sampling circuit, the master control circuit and the intelligent conversion circuit, the intelligent conversion of the AC signal is achieved, capable of outputting different alternating voltages and allowing the electric devices can be used in different states where different state grid parameters are applied.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

It should be noted that embodiments described in the ensuing disclosure are provided for exemplary purposes only, and should not be construed as limiting the scope of the disclosure in any way. Substitution of any suitable element for any element described herein is contemplated as within the scope of this disclosure; for instance, where a specific model or form of circuit element is disclosed herein, it should be understood that any similar element may be substituted to achieve a like effect. Moreover, any elements, blocks, or other attributes of any embodiment disclosed herein may be combined with any other such elements, blocks, or other attributes as consistent with the disclosure. Persons skilled in the art, upon reading the entirety of this disclosure, will be aware of many possible substitutions for and combinations of elements, circuits, and/or other components as disclosed herein as consistent with this disclosure.

Figure 1:
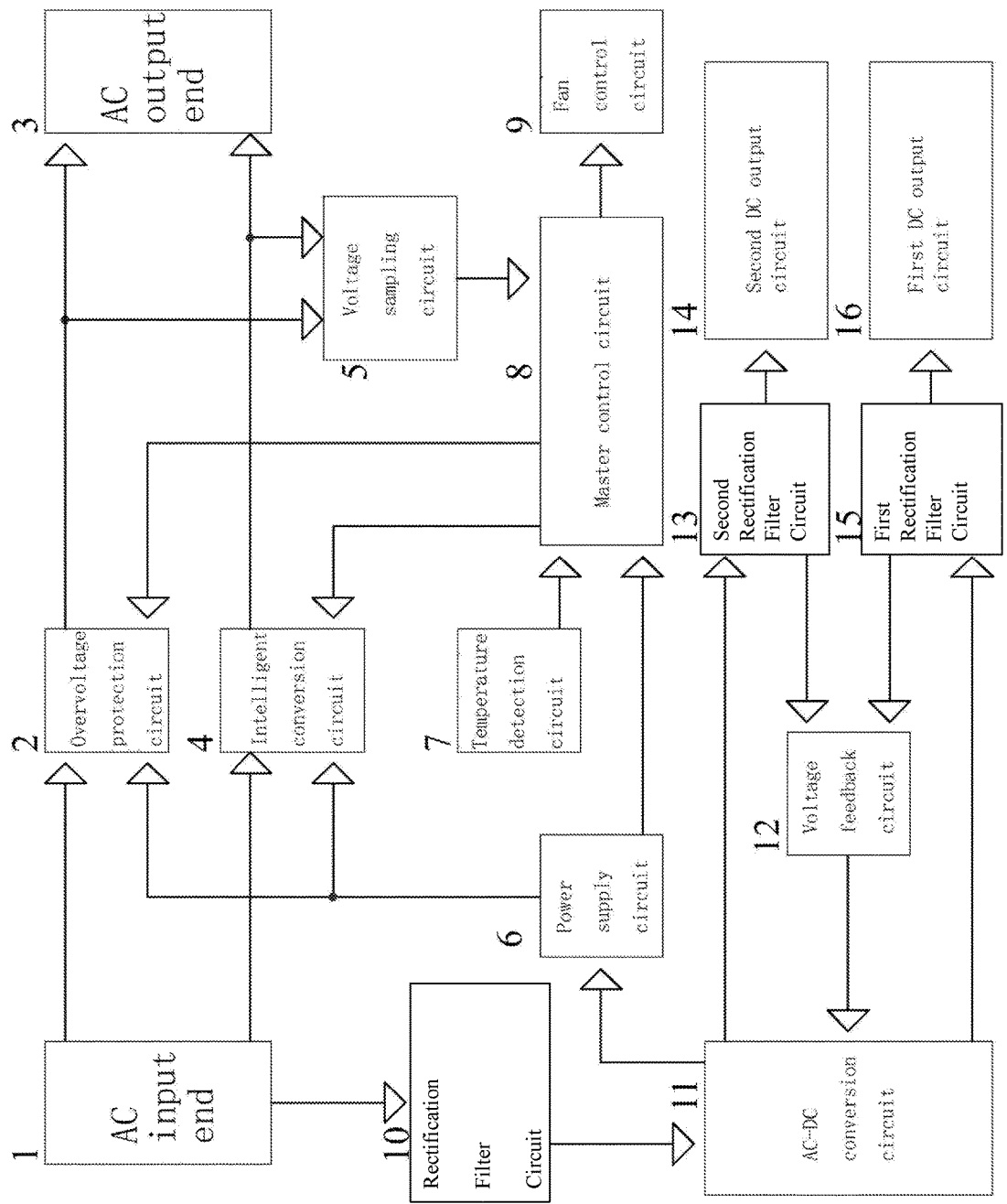
FIG. 1 is a block diagram of an alternating current conversion circuit according to an embodiment of the invention.

FIG. 1 is a functional block diagram of an alternating current conversion circuit according to a specific embodiment of the invention. As shown in FIG. 1, the alternating current conversion circuit includes an AC input end 1, an AC output end 3, an intelligent conversion circuit 4, a voltage sampling circuit 5 and a master control circuit 8. Intelligent conversion circuit 4 is configured to transmit a standard voltage inputted by AC input end 1 to AC output end 3, and convert a non-standard voltage inputted by the AC input end 1 into a standard voltage and output the standard voltage converted to the AC output end 3, under the control of master control circuit 8. Voltage sampling circuit 5 is configured to sample a voltage inputted by AC input end 1 and a voltage outputted by intelligent conversion circuit 4.

AC input end 1 is connected to AC output end 3 and a first input end of the intelligent conversion circuit 4. An output end of the intelligent conversion circuit 4 is connected to the AC output end 3. AC input end 1 and the output end of the intelligent conversion circuit 4 are connected to input ends of voltage sampling circuit 5, respectively, output end of the voltage sampling circuit 5 is connected to a first input end of the master control circuit 8, and a first output end of the master control circuit 8 is connected to a second input end of the intelligent conversion circuit 4.

The invention enables the intelligent conversion of an AC signal by means of the voltage sampling circuit, the master control circuit and the intelligent conversion circuit, for outputting different alternating voltages. While connected to a power supply via the alternating current conversion circuit of the invention, an electric device can be adapted to different state grid parameters.

As shown in FIG. 1, alternating current conversion circuit may also include an overvoltage protection circuit 2. AC input end 1 may be connected to AC output end 3 through overvoltage protection circuit 2, and a second output end of master control circuit 5 may be connected to a first input end of overvoltage protection circuit 2.

Figure 2:
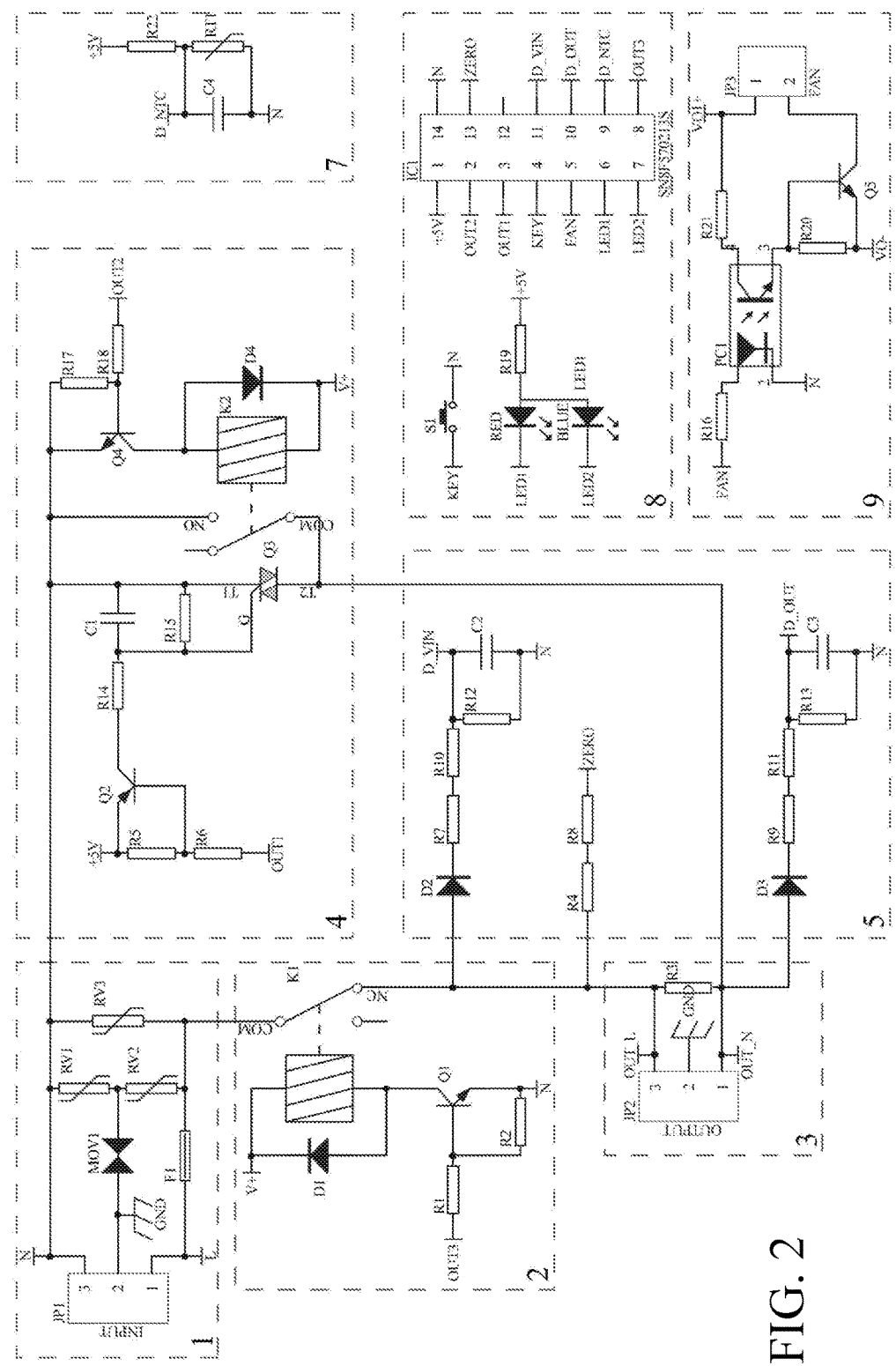
FIG. 2 and FIG. 3 are circuit diagrams of an alternating current conversion circuit according to an embodiment of the invention.
Figure 3:
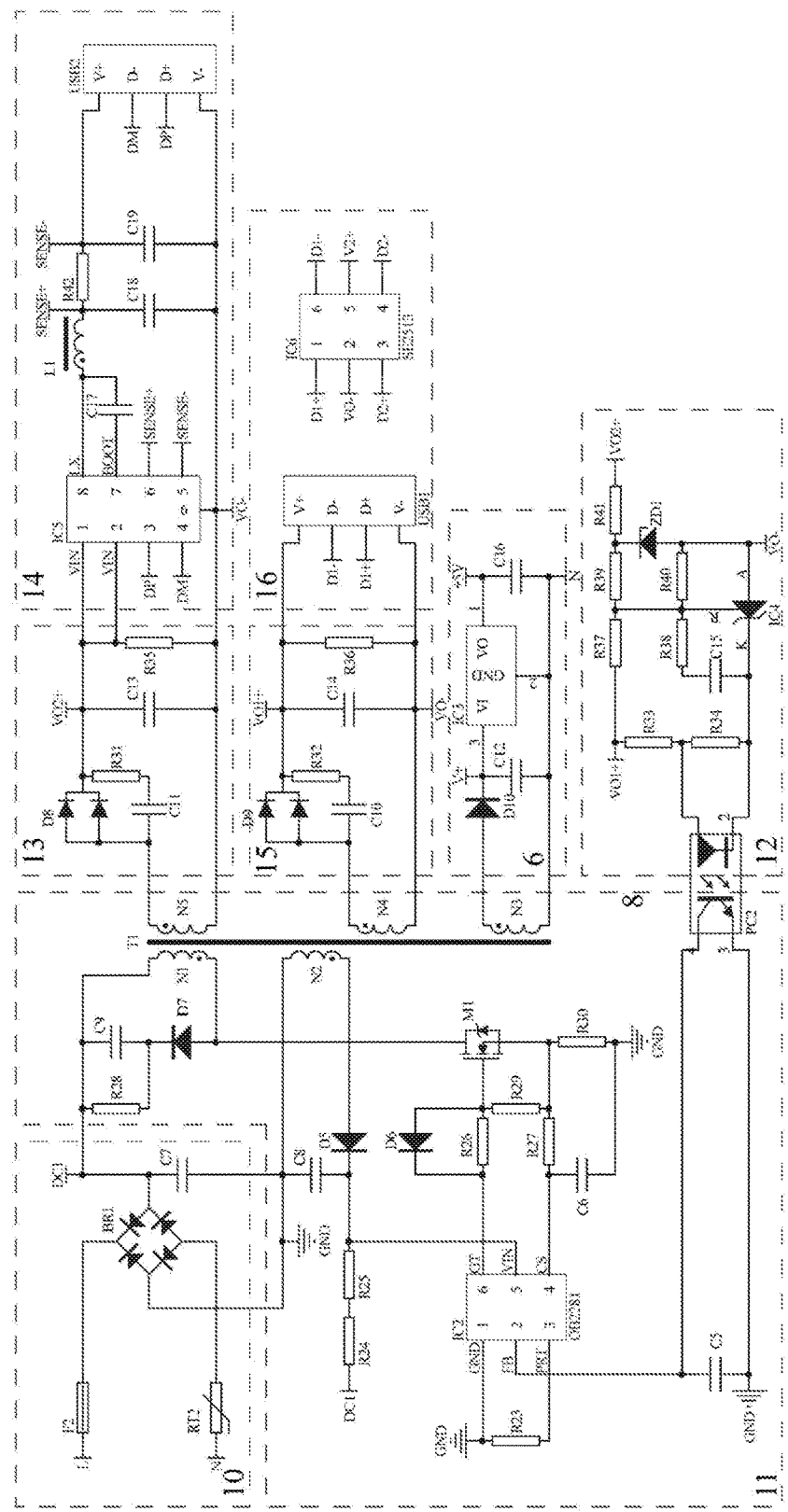

FIGS. 2 and 3 are schematic circuit diagrams of the alternating current conversion circuit according to an exemplary embodiment of the invention. Specifically, as shown in FIG. 2, The AC input end 1 may include a JP1 interface, a fuse F1 and a lightning protection circuit. An L wire and an N wire of an alternating current power supply may be connected to fuse F1 and lightning protection circuit through JP1 interface. Lightning protection circuit may include piezoresistors RV1, RV2 and RV3, and a discharge tube MOV1. Moreover, N wire may be connected to first input end of intelligent conversion circuit 4 (i.e. a T1 end of a controlled silicon Q3 and an NO end of a second relay K2 in the intelligent conversion circuit 4). Controlled silicon Q3 may be, e.g., a triode for alternating current (TRIAC) or similar device. AC output end 3 may include a JP2 interface and a resistor R3, where the resistor R3 provides a current loop to voltage sampling circuit when the AC output end 3 is unloaded. An OUT_L end of AC output end 3 may be connected to an NC end of a first relay K1 of overvoltage protection circuit 2, and an OUT N end of the AC output end 3 may be connected to a COM end of a second relay K2 of intelligent conversion circuit 4 and a T2 end of controlled silicon Q3. Overvoltage protection circuit 2 may include a first relay K1; a COM end of the first relay K1 may be connected to fuse F1, and an NC end of the first relay K1 may be connected to OUT_L end of AC output end 3. An on-off state of first relay K1 may be controlled by master control circuit 8. An on-off state, as used herein, is the state of a circuit element that may be characterized as capable of transitioning between an "on" state in which it is conducting electricity and an "off" state in which it is not conducting electricity; in other words, the on-off state of the circuit element may be either "on" (conducting) or "off" (not conducting). Master control circuit 8 may output an overvoltage protection signal OUT3 to drive a bipolar junction transistor Q1 through resistors R1 and R2, thereby to control the on-off state of the first relay K1, for the purpose of cutting off the output in case of overvoltage.

As shown in FIG. 2, voltage sampling circuit 5 may have three sampling signals D_VIN, D_OUT and ZERO; the three sampling signals D_VIN, D_OUT and ZERO may be transmitted to the master control circuit 8 (that is, the three signals are transmitted to a single chip IC1 of the master control circuit 8). D_VIN may be sampled from input voltage signal of AC input end 1, through a diode D2, divider resistors R7, R10 and R12, and a filter capacitor C2. D_OUT may be sampled from output voltage signal of AC output end 3, through a diode D3, divider resistors R9, R11 and R13, and a filter capacitor C3. ZERO may be sampled from a zero passage signal through resistors R4 and R8, and the ZERO signal gained may be inputted to a ZERO pin of the single chip IC1. In the embodiment, the master control circuit 8 comprises the single chip IC1 and a peripheral circuit for the single chip. As a non-limiting example, an SN8F570213S single chip microcontroller, as produced by Sonix Technology Co., Ltd. of Zhubei City, Hsinchu County 302, Taiwan, may be used as the single chip IC1, for the purpose of controlling the operation of intelligent conversion circuit 4, by means of circuit signal of detecting or sampling circuit connected to an external pin (such as the signal inputted from voltage sampling circuit 5), which may be processed by an internal digital control circuit of the single chip IC1, so as to intelligently control the AC output end to output the voltage signal desired. In addition, master control circuit 8 may include a trigger circuit including of a touch switch Si and an AC output status LED indicating circuit; the AC output status LED indicating circuit may include a red LED lamp and a blue LED lamp used for indicating the output status of AC output end.

As shown in FIG. 2, intelligent conversion circuit 4 may include controlled silicon Q3 and second relay K2. AC input end 1 may be connected to AC output end 3 through controlled silicon Q3. AC input end 1 may be connected to AC output end 3 through second relay K2. Master control circuit 8 may connected with controlled silicon Q3 and second relay K2 to control on-off states of the controlled silicon and the relay. As a non-limiting example, the master control circuit 8 may output two signals OU1 and OUT2 to respectively control on-off states of controlled silicon Q3 and second relay K2. When a high-voltage input is applied at AC input end 1, OUT1 voltage reduction signal may be generated to drive bipolar junction transistor Q2 through resistors R6 and R5, thereby controlling a conduction angle of controlled silicon Q3 through resistors R14 and R15, and filter capacitor C1, for the purpose of voltage reduction output through the controlled silicon Q3 in case of the high-voltage input. Moreover, where a low-voltage input is applied at AC input end 1, OUT2 switching signal may be generated to drive bipolar junction transistor Q4 through resistors R17 and R18, thereby controlling on-off state of second relay K2, for the purpose of enabling the output to follow the input in case of low-voltage input.

As a non-limiting example, as shown in FIG. 2 again, intelligent conversion circuit 4 may function as follows: master control chip of master control circuit firstly may detect a trigger signal of a trigger circuit through a KEY pin; after Si triggers a power-on, single chip IC1 may detect an input voltage at AC input end 1 through D_VIN pin, and compare the input voltage detected with a preset internal reference voltage to determine the degree of the input voltage at the AC input end 1; if the input voltage of the AC input end 1 is determined as "high voltage" (such as 220 VAC, that is a non-standard voltage, and can be set arbitrarily), the single chip IC1 may detect zero passage signal through the ZERO pin, and generate a fixedly delayed OUT1 voltage reduction signal in each half cycle to control the conduction of controlled silicon Q3 through an output switching circuit, converting the high-voltage (220 VAC) input into a low-voltage (110 VAC) output through the adjustment to the conduction angle of the controlled silicon Q3, for the purpose of voltage reduction and stabilization; if the input voltage is determined as "low voltage" (110 VAC, that is a standard voltage, and can be set arbitrarily), the single chip IC1 may generate a switching signal at an OUT2 pin to control the conduction of second relay K2 through intelligent conversion circuit 4, for the purpose of directly outputting the low voltage inputted to the output end. Therefore, the intelligent conversion of the input voltage can be achieved by comparing the external circuit signals with the internal reference signals by the single chip IC1.

As a further improvement to the above technical solution, as shown in FIGS. 1 and 2, an exemplary embodiment of alternating current conversion circuit may include a temperature detection circuit 7 and a fan control circuit 9. Temperature detection circuit 7 may be used for detecting an ambient temperature of alternating current conversion circuit. For instance, an output end of temperature detection circuit 7 may be connected to a second input end of master control circuit 8, and a third output end of the master control circuit 8 may be connected to an input end of the fan control circuit 9. A D_NTC temperature detection signal of temperature detection circuit 7 may be provided by a temperature detection circuit consisting of a twenty-second resistor R22, a thermistor RT1 and a filter capacitor C4, and the temperature detection signal may be provided to the D_NTC pin of the single chip IC1. Moreover, regarding fan control circuit, the single chip IC1 may output a control signal at a FAN pin to an optocoupler PC1 through a resistor R16, to drive bipolar junction transistor Q3 through resistors R20 and R21, for the purpose of controlling a fan connected at a JP3 interface.

As shown in FIG. 2, intelligent conversion circuit 4 may further provide an overvoltage protection function and an over-temperature protection function for high-voltage input. While controlled silicon Q3 has failed and is no longer performing voltage reduction and is directly conducting, single chip IC1 may detect a low level momentary signal at D_OUT pin through voltage sampling circuit 5 and determine that the controlled silicon Q3 has failed and is directly conducting. In this case, single chip IC1 may output an overvoltage protection signal at OUT3 pin through overvoltage protection circuit 2 to control first relay K1, i.e. to cut off connection between COM end and OC end of the first relay K1, so as to cut off the input voltage to protect an output load. Single chip IC1 may detect a temperature of alternating current conversion circuit at D_NTC pin through temperature detection circuit 7, while single chip IC1 may detect that a temperature of the working environment of the alternating current conversion circuit has reached a preset temperature in the single chip IC1; single chip IC1 may output a voltage reduction signal at OUT1 pin to adjust a conduction angle of controlled silicon Q3, so as to reduce AC output voltage and the output power, and meanwhile, the single chip IC1 may output a signal at FAN pin to activate fan control circuit 9, so as to lower the temperature of the working environment of the alternating current conversion circuit. In addition, if single chip IC1 detects that temperature of alternating current conversion circuit continuously increases, it may activate an over-temperature protection function, i.e., to turn off controlled silicon Q3 through OUT1 pin, for over-temperature protection.

When designed for an 110 VAC or 220 VAC grid, alternating current conversion circuit of the invention may intelligently recognize input voltage, and convert 220 VAC into 110 VAC through intelligent conversion circuit. In addition, alternating current conversion circuit of the invention has the advantage of intelligent conversion, voltage reduction and stabilization, overvoltage protection and over-temperature protection.

As a further exemplary improvement to the above technical solution, as shown in FIG. 1, alternating current conversion circuit may include a rectification filter circuit 10, an AC-DC conversion circuit 11, a rectification filter unit and a DC output circuit. AC input end 1 may be connected to an input end of rectification filter circuit 10, an output end of the rectification filter circuit 10 may be connected to an input end of the AC-DC conversion circuit 11, an output end of the AC-DC conversion circuit 11 may be connected to the input end of the rectification filter unit, and the output end of the rectification filter unit may connected to an input end of DC output circuit. Specifically, FIG. 3 is a schematic circuit diagram of the alternating current conversion circuit according to a specific embodiment of the invention. As shown in FIG. 3, rectification filter circuit 10 may be a bridge rectification filter circuit, an L wire and an N wire of the AC input end 1 may be connected to a rectification bridge BR1 and a filter capacitor C7 through a fuse F2 and a thermistor RT2, respectively. The AC-DC conversion circuit may include a current mode pulse-width modulated (PWM) controller IC2, such as an OB2281 chip a s produced by On Bright Electronics, Ltd of Shanghai, China, and a peripheral circuit for the current mode PWM controller; the peripheral circuit may include a transformer T1 and a power tube M1.

As shown in FIG. 1, rectification filter unit may include a first rectification filter circuit 15 and a second rectification filter circuit 13, and DC output circuit may include a first DC output circuit 16 and a second DC output circuit 14. output end of AC-DC conversion circuit 11 may be connected to input ends of the first rectification filter circuit 15 and second rectification filter circuit 13, output end of the first rectification filter circuit 15 may be connected to input end of first DC output circuit 16, and output end of the second rectification filter circuit 13 may be connected to input end of second DC output circuit 14. As shown in FIG. 3, first rectification filter circuit 15 may include a ninth diode D9, which may be a dual diode including two parallel diodes or the equivalent, and a fourteenth capacitor C14; a first DC voltage VO1+ may be outputted by an N4 winding of T1 transformer in AC-DC conversion circuit 11 through ninth diode D9 and fourteenth capacitor C14, once rectified and filtered. First DC output circuit may include a first universal serial bus (USB) interface USB1, a USB recognition chip IC6, and a peripheral circuit for the USB recognition chip IC6. For instance, output end of first rectification filter circuit 15 may be connected to input end of USB recognition chip IC6, and the USB recognition chip IC6 may be connected to first USB interface USB1. USB recognition chip may be provided as any suitable model, including without limitation an SE2513 as manufactured by Seaward Electronics, Inc. of Beijing, China, or an LT8022, as manufactured by Lintop Technology Co., Ltd of Shenzhen, China. Second rectification filter circuit 13 may include an eighth diode D8 and a thirteenth capacitor C13; a second DC voltage VO2+ may be outputted by an N5 winding of a T1 transformer in a AC-DC conversion circuit 11 through eighth diode D8 and thirteenth capacitor C13, once rectified and filtered. Second DC output circuit 14 may include a voltage reduction chip IC5 (UP9616), an inductance L1 and a second USB interface USB2, and second DC output circuit 14 may be used as a DC-DC voltage reduction circuit.

As shown in FIGS. 1 and 3, L wire and N wire of the AC input end 1 may be connected to fuse F2 and thermistor RT2 to form a first DC (DC1) through a bridge rectification filter circuit. First DC (DC1) may be connected to a circuit consisting of transformer T1, power metal-oxide field effect transistor (MOSFET) M1 and current sampling resistor R3; the current mode PWM controller chip IC2 at its FB pin may detect a feedback signal from a voltage feedback circuit through an optocoupler PC2. Feedback signal may be compared with a reference signal preset in current mode PWM controller chip IC2, and an opening signal for the power MOSFET M1 may be outputted at a GT pin of current mode PWM controller chip IC2, so that the outputs of first rectification filter circuit 15 and second rectification filter circuit 13 are stabilized by duty ratio adjustment. Second DC voltage VO2+ may be outputted to USB interface USB2 through DC-DC voltage reduction circuit, which may include a UP9616 buck converter chip as manufactured by UPI Semiconductor Corp. of Hsinchu, Taiwan and a peripheral circuit for the UP9616 chip, or any analogous product. First DC voltage VO1+ is outputted to the first USB interface USB1 through the USB recognition circuit, which may include an SE2513 chip as described above. In addition, alternating current conversion circuit may include a supply circuit 6 configured to supply electricity to master control circuit 8, the intelligent conversion circuit 4 and the overvoltage protection circuit. A supply voltage V+ may be outputted by an N3 winding of transformer T1 in AC-DC conversion circuit 11 through diode D10 and capacitor C12, once rectified and filtered. Overvoltage protection circuit 2 and the intelligent conversion circuit 4 may be powered by a supply voltage V+, and master control circuit 8 may be powered by a +5V through a three-end voltage regulator IC3 and a filter capacitor C15.

As a further improvement to the above technical solution, as shown in FIG. 1, alternating current conversion circuit may include a voltage feedback circuit 12. As a non-limiting example, output end of first rectification filter circuit 15 and output end of second rectification filter circuit 13 may be connected to an input end of voltage feedback circuit 12, and an output end of the voltage feedback circuit 12 may be connected to another input end of AC-DC conversion circuit 11. As shown in FIG. 3, voltage feedback circuit 12 may include a fourth voltage stabilizer IC4, which may be a TL431 as manufactured by Texas Instruments of Dallas, Tex., a second isolation optocoupler PC2, a first voltage regulator ZD1, which may be a Zener diode, and peripheral power supply resistors (a thirty-third resistor R33 and a thirty-fourth resistor R34) and voltage sampling resistors (a thirty-seventh resistor R37, a thirty-ninth resistor R39, a fortieth resistor R40 and a forty-first resistor R41). Voltage signals of first DC output voltage VO1+ and second DC output voltage VO2+ may be detected at an R electrode of fourth voltage stabilizer IC4, and compared with a reference voltage preset in fourth voltage stabilizer IC4, and based on the comparison, the voltage value of a K electrode may be controlled to turn on second isolation optocoupler PC2, whereby fourth voltage stabilizer IC4 may feed back voltage signals of VO1+ and VO2+ to an FB pin of chip IC2 through the second isolation optocoupler PC2. Based on the voltage signals received, chip IC2 may output a PWM signal to power MOSFET M1 by adjusting its internal PWM signal for stabilizing VO1+. Since second DC has voltage sampling resistors R39, R40 and R41, the second DC has a feedback in the voltage feedback loop, which can increase the loading capability of the second DC output. In addition, voltage sampling circuit of the second DC output voltage VO2+ includes voltage regulator ZD1, since the voltage stabilization effect of the voltage regulator ZD1 can keep the current across fortieth resistor R40 unchanged so that second DC output has stable voltage sampling current, and since first DC output voltage can feed back voltage signal to AC-DC conversion circuit 11 through voltage sampling resistors R37 and R40 to keep output of the main circuit (the first DC output circuit) stable, stable voltage feedback may increase the loading capability of second DC output circuit (an assistant circuit) without affecting the stability of the output voltage of the main circuit.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An alternating current (AC) conversion circuit, comprising:
   an AC input end;
   an AC output end, connected to the AC input end;
   a master control circuit; and
   an intelligent conversion circuit, having a first input end connected to the AC input end, a second input end connected to a first output end of the master control circuit, and an output end connected to the AC output end;
      the intelligent conversion circuit being configured to output a standard voltage inputted by the AC input end to the AC output end, and convert a non-standard voltage inputted by the AC input end to a standard voltage and output the standard voltage converted to the AC output end, under control of the master control circuit;
   a voltage sampling circuit, having input ends connected to the AC input end and the output end of the intelligent conversion circuit, respectively, and an output end connected to a first input end of the master control circuit;
      the voltage sampling circuit being configured to sample a voltage inputted by the AC input end and a voltage outputted by the intelligent conversion circuit.

2. The alternating current conversion circuit according to claim 1, further comprising an overvoltage protection circuit, through which the AC input end and the AC output end are interconnected, wherein a second output end of the master control circuit is connected to an input end of the overvoltage protection circuit.

3. The alternating current conversion circuit according to claim 2, wherein the overvoltage protection circuit comprises a first resistor, a second resistor, a first diode, a first relay and a first negative-positive-negative (NPN) bipolar junction transistor, wherein the first relay is a single-pole double-throw relay, the second output end of the master control circuit is connected to a first end of the first resistor, a second end of the first resistor is connected to a first end of the second resistor and a base of the first NPN bipolar junction transistor, an emitter of the first NPN bipolar junction transistor is connected to a second end of the second resistor, the second end of the second resistor is grounded, a collector of the first NPN bipolar junction transistor is connected to an anode of the first diode and a first coil connecting end of the first relay, a second coil connecting end of the second relay is connected to a power supply and a cathode of the first diode, the AC input end is connected to a common connecting end of the first relay, a first output end of the first relay is connected to the AC output end, and a second output end of the first relay is idled.

4. The alternating current conversion circuit according to claim 1, further comprising a temperature detection circuit and a fan control circuit, the temperature detection circuit being configured to detect a temperature of the working environment of the alternating current conversion circuit, wherein an output end of the temperature detection circuit is connected to a second input end of the master control circuit, and a third output end of the master control circuit is connected to an input end of the fan control circuit.

5. The alternating current conversion circuit according to claim 4, wherein the temperature detection circuit comprises a fourth capacitor, a twenty-second resistor and a thermistor, wherein a first end of the fourth capacitor and a first end of the thermistor are connected to the second input end of the master control circuit, a second end of the fourth capacitor is grounded, a second end of the thermistor is connected to the second end of the fourth capacitor, one end of first the thermistor is connected to the first end of the twenty-second resistor, and the second end of the twenty-second resistor is connected to a power supply.

6. The alternating current conversion circuit according to claim 1, wherein the intelligent conversion circuit comprises a controlled silicon and a relay, through which the AC input end and the AC output end are connected, and the master control circuit is connected to the controlled silicon and the relay for controlling an on-off state of the controlled silicon and the relay.

7. The alternating current conversion circuit according to claim 1, wherein the master control circuit comprises a single chip and a peripheral circuit for the single chip.

8. The alternating current conversion circuit according to claim 1, further comprising a rectification filter circuit, an AC-direct current (DC) conversion circuit, a rectification filter unit and a DC output circuit, wherein the AC input end is connected to an input end of the rectification filter circuit, an output end of the rectification filter circuit is connected to an input end of the AC-DC conversion circuit, an output end of the AC-DC conversion circuit is connected to an input end of the rectification filter unit, and an output end of the rectification filter unit is connected to an input end of the DC output circuit.

9. The alternating current conversion circuit according to claim 8, wherein the rectification filter circuit is a bridge-type rectification filter circuit.

10. The alternating current conversion circuit according to claim 8, wherein the AC-DC conversion circuit comprises an OB2281 chip and a peripheral circuit for the OB2281 chip.

11. The alternating current conversion circuit according to claim 8, wherein the rectification filter unit comprises a first rectification filter circuit and a second rectification filter circuit, and the DC output circuit comprises a first DC output circuit and a second DC output circuit, wherein the output end of the AC-DC conversion circuit is connected to an input end of the first rectification filter circuit and an input end of the second rectification filter circuit, an output end of the first rectification filter circuit is connected to an input end of the first DC output circuit, and an output end of the second rectification filter circuit is connected to an input end of the second DC output circuit.

12. The alternating current conversion circuit according to claim 11, wherein the first rectification filter circuit comprises a ninth diode and a fourteenth capacitor, the ninth diode is a dual diode, the output end of the AC-DC conversion circuit is connected to an anode of the ninth diode and a first end of the fourteenth capacitor, a cathode of the ninth diode is connected to a second end of the fourteenth capacitor, the first end of the fourteenth capacitor is grounded, and the first end and second end of the fourteenth capacitor are connected to the input end of the first DC output circuit.

13. The alternating current conversion circuit according to claim 11, wherein the second rectification filter circuit comprises an eighth diode and a thirteenth capacitor, wherein the eighth diode is a dual diode, the output end of the AC-DC conversion circuit is connected to an anode of the eighth diode and a first end of the thirteenth capacitor, a cathode of the eighth diode is connected to a second end of the thirteenth capacitor, the first end of the thirteenth capacitor is grounded, and the first end and second end of the thirteenth capacitor are connected to the input end of the second DC output circuit.

14. The alternating current conversion circuit according to claim 11, wherein the second DC output circuit comprises a second universal serial bus (USB) interface, a voltage reduction chip, and a peripheral circuit for the voltage reduction chip, and wherein the output end of the second rectification filter circuit is connected to an input end of the voltage reduction chip, and an output end of the voltage reduction chip is connected to the second USB interface.

15. The alternating current conversion circuit according to claim 11, further comprising a voltage feedback circuit, wherein the output end of the first rectification filter circuit and the output end of the second rectification filter circuit are connected to an input end of the voltage feedback circuit, and an output end of the voltage feedback circuit is connected to a second input end of the AC-DC conversion circuit.

16. The alternating current conversion circuit according to claim 15, wherein the voltage feedback circuit comprises a fourth voltage stabilizer, a second isolation optocoupler, a first voltage regulator, a thirty-third resistor, a thirty-fourth resistor, a thirty-seventh resistor, a thirty-ninth resistor, a fortieth resistor and a forty-first resistor, wherein the output end of the first rectification filter circuit is connected to a first end of the thirty-third resistor and a first end of the thirty-seventh resistor, a second end of the thirty-third resistor is connected to a positive input end of the second isolation optocoupler and a first end of the thirty-fourth resistor, a second end of the thirty-fourth resistor is connected to a negative output end of the second isolation optocoupler and an output end of the fourth voltage stabilizer, an output end and the input end of the fourth voltage stabilizer are grounded, a second end of the thirty-seventh resistor is connected to a first end of the thirty-ninth resistor, a first end of the fortieth resistor and a common leading-out end of the fourth voltage stabilizer, an input end of the fourth voltage stabilizer is connected to a second end of the fortieth resistor, the second end of the fortieth resistor is connected to an anode of the first voltage regulator, a cathode of the first voltage regulator is connected to a second end of the thirty-ninth resistor and the first end of the forty-first resistor, and the second end of the forty-first resistor is connected to the output end of the second rectification filter circuit; and an output end of the second isolation optocoupler is connected to the second input end of the AC-DC conversion circuit.

17. The alternating current conversion circuit according to claim 11, wherein the first DC output circuit comprises a first USB interface, an USB recognition chip connected to the first USB interface, and a peripheral circuit for the USB recognition chip, wherein an input end of the USB recognition chip is connected to the output end of the first rectification filter circuit.

18. The alternating current conversion circuit according to claim 17, wherein the USB recognition chip is an SE2513 chip.

19. The alternating current conversion circuit according to claim 17, wherein the USB recognition chip is an LT8022 chip.

* * * * *